United States Patent
Yang et al.

(10) Patent No.: US 12,555,939 B2
(45) Date of Patent: Feb. 17, 2026

(54) CONNECTION TERMINAL, CONNECTION TERMINAL ASSEMBLY, CABLE ASSEMBLY, AND CHARGING SEAT

(71) Applicants: Tyco Electronics (Suzhou) Ltd., Suzhou (CN); Tyco Electronics Technology (SIP) Ltd., Suzhou (CN); Tyco Electronics (Shanghai) Co., Ltd., Shanghai (CN)

(72) Inventors: Jian Yang, Suzhou (CN); Jianwen (Gerry) Zhang, Suzhou (CN); Weidong Zhang, Shanghai (CN); Jinshun (Jet) Wang, Suzhou (CN); Fangyue (Jason) Zhu, Shanghai (CN); Han Wu, Suzhou (CN); Ming Xu, Suzhou (CN)

(73) Assignees: Tyco Electronics (Shanghai) Co., Ltd., Shanghai (CN); Tyco Electronics Technology (SIP) Ltd., Suzhou (CN); Tyco Electronics (Suzhou) Ltd., Suzhou (CN)

( * ) Notice: Subject to any disclaimer, the term of this patent is extended or adjusted under 35 U.S.C. 154(b) by 328 days.

(21) Appl. No.: 18/325,601

(22) Filed: May 30, 2023

(65) Prior Publication Data
US 2023/0387618 A1    Nov. 30, 2023

(30) Foreign Application Priority Data
May 30, 2022   (CN) .......................... 202221317906.2

(51) Int. Cl.
*H01R 13/04*    (2006.01)
*H01R 13/44*    (2006.01)

(52) U.S. Cl.
CPC .............. *H01R 13/04* (2013.01); *H01R 13/44* (2013.01)

(58) Field of Classification Search
CPC ...... H01R 13/04; H01R 13/44; H01R 13/443; H01R 4/22
(Continued)

(56) References Cited

U.S. PATENT DOCUMENTS

| | | | | |
|---|---|---|---|---|
| RE32,864 E | * | 2/1989 | Ezure ................... | H01R 13/627 439/152 |
| 6,860,746 B2 | * | 3/2005 | Ota ........................ | H01R 13/03 439/886 |

(Continued)

FOREIGN PATENT DOCUMENTS

| | | | |
|---|---|---|---|
| CN | 207098132 U | * 3/2018 | .......... H01R 13/227 |
| CN | 207994141 U |   10/2018 | |

(Continued)

OTHER PUBLICATIONS

Extended European Search Report dated Oct. 11, 2023, corresponding to Application No. 23175992.9-1201, 11 pages.

*Primary Examiner* — Harshad C Patel
(74) *Attorney, Agent, or Firm* — Barley Snyder (57) ABSTRACT

A connection terminal includes a body part and an installation part. The body part is insertable into a mating terminal for electrical contact with the mating terminal. The installation part is insertable into a finger protective cap for installing the finger protective cap. The installation part is formed on and protrudes from an end face of an end of the body part. A root of the installation part connected to the end face of the body part is formed into an arc-shaped connection part, preventing stress concentration at the root.

17 Claims, 7 Drawing Sheets

(58) Field of Classification Search
USPC .......................................................... 439/750
See application file for complete search history.

(56) References Cited

U.S. PATENT DOCUMENTS

| | | | | |
|---|---|---|---|---|
| 6,918,800 | B2* | 7/2005 | Ota | H01R 13/03 |
| | | | | 439/886 |
| 7,150,638 | B1* | 12/2006 | Fonville | H01R 13/5213 |
| | | | | 439/135 |
| 7,354,284 | B2* | 4/2008 | Aime | H01R 13/443 |
| | | | | 439/148 |
| 7,507,108 | B2* | 3/2009 | Tsuji | H01R 13/5841 |
| | | | | 439/446 |
| 7,862,366 | B2* | 1/2011 | Stone | H01R 13/5219 |
| | | | | 285/305 |
| 7,997,929 | B2* | 8/2011 | Montena | H01R 9/0524 |
| | | | | 439/578 |
| 8,137,131 | B2* | 3/2012 | Wang | H01R 12/725 |
| | | | | 439/570 |
| 11,469,542 | B2* | 10/2022 | Bailey | H01R 13/5213 |
| 11,799,243 | B2* | 10/2023 | Wronowski | H01R 24/54 |
| 2002/0123255 | A1* | 9/2002 | Kertesz | H01R 13/4532 |
| | | | | 439/135 |
| 2006/0148287 | A1* | 7/2006 | Zahnen | H01R 13/5213 |
| | | | | 439/135 |

FOREIGN PATENT DOCUMENTS

| | | |
|---|---|---|
| DE | 4400555 A1 | 7/1994 |
| DE | 202013001165 U1 | 5/2014 |
| JP | 2018022581 A | 2/2018 |

* cited by examiner

CONNECTION TERMINAL, CONNECTION TERMINAL ASSEMBLY, CABLE ASSEMBLY, AND CHARGING SEAT

CROSS-REFERENCE TO RELATED APPLICATION

This application claims the benefit of the filing date under 35 U.S.C. § 119(a)-(d) of Chinese Patent Application No. 202221317906.2, filed on May 30, 2022.

FIELD OF THE INVENTION

The present invention relates to a connection terminal, a connection terminal assembly comprising the connection terminal, a cable assembly comprising the connection terminal, and a charging seat comprising the connection terminal.

BACKGROUND

In the prior art, the charging terminal in the charging seat of a new energy vehicle typically includes a columnar body part, an installation part protruding from one end of the columnar body part for installing a finger protective cap, and a welding portion connected to the other end of the columnar body part. The welding portion of the charging terminal is usually welded to a cable conductor by ultrasonic welding.

In the prior art, the diameter of the installation part of the charging terminal is smaller than the columnar body part. Therefore, there is stress concentration at the root of the installation part connected to the columnar body part, and since the installation part is usually a solid body, the mass is relatively large. When ultrasonic welding is used for cable conductor and charging terminal, the charging terminal will have high-frequency vibration, which will lead to fatigue and fracture of the installation part at the end of the charging terminal.

Moreover, in the prior art, during the mating process between the charging terminal and the mating charging terminal, the finger protective cap installed on the end of the charging terminal is easily detached from the installation part of the charging terminal, which can lead to the risk of electric shock due to human fingers touching the end of the charging terminal.

SUMMARY

A connection terminal includes a body part and an installation part. The body part is insertable into a mating terminal for electrical contact with the mating terminal. The installation part is insertable into a finger protective cap for installing the finger protective cap. The installation part is formed on and protrudes from an end face of an end of the body part. A root of the installation part connected to the end face of the body part is formed into an arc-shaped connection part, preventing stress concentration at the root.

BRIEF DESCRIPTION OF THE DRAWINGS

Features of the present invention will become more apparent by describing in detail exemplary embodiments thereof with reference to the accompanying drawings, in which.

DETAILED DESCRIPTION OF EXEMPLARY EMBODIMENTS

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As shown in FIGS. 1 to 4, in the illustrated embodiment, a connection terminal 1 includes a body part 10 and an installation part 11. The body part 10 is suitable for inserting into a mating terminal for electrical contact with the mating terminal. The installation part 11 is suitable for inserting into a finger protective cap 2 for installing the finger protective cap 2.

As shown in FIGS. 1 to 4, in the illustrated embodiments, the installation part 11 is formed on and protrudes from the end face 10a of one end of the body part 10. An insertion hole 112 is formed on the installation part 11, which is suitable for matching with an insertion post 22 in the finger protective cap 2. In the illustrated embodiment, due to the formation of an insertion hole 112 on the installation part 11, the weight of the installation part 11 is reduced, thereby preventing its fracture during high-frequency vibration.

As shown in FIGS. 1 to 6, in the illustrated embodiments, the root of the installation part 11 connected to the end face 10a of the body part 10 is formed into an arc-shaped connection part 11b, and the installation part 11 and the body part 10 are connected to each other by the arc-shaped connection part 11b to prevent stress concentration at the root of the installation part 11. For example, in the illustrated embodiment, an arc-shaped chamfer 11c is formed at the root of the installation part 11 connected to the end face 10a of the body part 10 to prevent stress concentration at the root of the installation part 11. This can prevent the root of the installation part 11 from breaking due to high-frequency vibration.

As shown in FIGS. 1 to 6, in the illustrated embodiment, the installation part 11 extends along an axial direction of the body part 10, the end face 10a of the body part 10 extends along a radial direction of the body part 10, and the cross section of the arc-shaped chamfer 11c is an arc with a central angle equal to 90 degrees.

As shown in FIGS. 1 to 6, in the illustrated embodiments, a radial protrusion 110 is formed on the outer peripheral surface of the installation part 11, and the radial protrusion 110 is suitable for being engaged in a radial recess 210 on an inner peripheral surface of the finger protective cap 2.

As shown in FIGS. 1 to 6, in the illustrated embodiments, a blocking surface 110a is formed on one side of the radial protrusion 110 of the installation part 11, and a corresponding blocking surface 210a is formed on one side of the radial recess 210 in the finger protective cap 2. The blocking surface 110a is suitable for leaning against the corresponding blocking surface 210a to prevent the finger protective cap 2 from being removed from the installation part 11.

As shown in FIGS. 1 to 6, in the illustrated embodiment, the outer diameter of the radial protrusion 110 on the installation part 11 is slightly larger than the inner diameter of the finger protective cap 2 at the radial recess 210. When the finger protective cap 2 is sleeved on the installation part 11, the radial protrusion 110 on the installation part 11 is interference fit with the inner peripheral surface of the finger protective cap 2 to increase the engagement force between the finger protective cap 2 and the installation part 11.

As shown in FIGS. 1 to 6, in the illustrated embodiments, when the finger protective cap 2 is installed on the installation part 11, the end face 10a of the body part 10 is pressed against the end face 21a of the open end of the finger protective cap 2 and is covered by the finger protective cap 2 to prevent human fingers from touching the end face 10a of the body part 10. In the illustrated embodiment, when the finger protective cap 2 is installed on the installation part 11, the end face 11a of the installation part 11 usually does not come into contact with the finger protective cap 2, thereby not limiting the installation position of the finger protective cap 2.

As shown in FIGS. 1 to 6, in the illustrated embodiment, the inner diameter of the insertion hole 112 on the installation part 11 is slightly smaller than the outer diameter of the insertion post 22 in the finger protective cap 2. When the finger protective cap 2 is sleeved on the installation part 11, the inner peripheral surface of the insertion hole 112 on the installation part 11 is interference fit with the insertion post 22 in the finger protective cap 2.

As shown in FIGS. 1 to 6, in the illustrated embodiment, the connection terminal 1 further includes a welding end 12, which is connected to the other end of the body part 10 and adapted to be welded to a cable conductor.

As shown in FIGS. 1 to 6, in the illustrated embodiments, the welding end 12 is flat and the body 10 is cylindrical. The welding end 12 is radially offset to one side relative to the body part 10, so that the central axis of the cable conductor welded to the top surface of the welding end 12 coincides with the central axis of the body 10 or the distance between the two is less than a predetermined value.

As shown in FIGS. 1 to 6, in the illustrated embodiment, the connection terminal 1 further includes a connection portion 14, which is connected between the other end of the body part 10 and one end of the welding end 12 and extends obliquely relative to the body part 10.

As shown in FIGS. 1 to 6, in the illustrated embodiment, the connection terminal 1 is an integral component. For example, the connection terminal 1 can be an integral machined part or an integral stamping formed part.

As shown in FIGS. 1 to 6, in the illustrated embodiments, the extension length of the installation part 11 in the axial direction of the body part 10 is not greater than half, one-third, or quarter of the axial extension length of the finger protective cap 2. In this way, the axial extension length of the installation part 11 can be reduced to prevent fracture of the installation part 11 due to high-frequency vibration.

As shown in FIGS. 1 to 6, in an exemplary embodiment of the present invention, a connection terminal assembly is also disclosed. The connection terminal assembly includes: the connection terminal 1 and the finger protective cap 2 as shown in the figures. The finger protective cap 2 is installed on the installation part 11 at the end of the connection terminal 1. An insertion post 22 is formed inside the finger protective cap 2, which is inserted into the insertion hole 112 on the installation part 11.

As shown in FIGS. 1 to 6, in an exemplary embodiment of the present invention, a cable assembly is also disclosed. The cable assembly includes a cable and the connection terminal 1 shown in the attached figures. The cable has an exposed cable conductor. The connection terminal 1 has a welded end 12. The cable conductor is welded to the welding end 12 of the connection terminal 1. For example, the cable conductor can be welded to the welding end 12 of the connection terminal 1 by ultrasonic welding.

As shown in FIGS. 1 to 6, in the illustrated embodiment, the cable assembly also includes the finger protective cap 2 as described above, which is installed on the installation part 11 at the end of the connection terminal 1.

As shown in FIGS. 1 to 6, in an exemplary embodiment of the present invention, a charging seat is also disclosed. The charging seat includes a housing and the connection terminal 1 as described above. The connection terminal 1 is inserted into the housing for matching with a mating terminal in a charging gun.

As shown in FIGS. 1 to 6, in the illustrated embodiment, the charging seat also includes the finger protective cap 2. The finger protective cap 2 is installed on the installation part 11 at the end of the connection terminal 1 to prevent human fingers from touching the end of the connection terminal 1.

As shown in FIGS. 1 to 6, in an exemplary embodiment of the present invention, the charging seat also includes a cable. This cable has an exposed cable conductor. The cable conductor is welded to the welding end 12 of the connection terminal 1. In this way, the connection terminal 1 can be electrically connected to a charging battery through a cable.

As shown in FIGS. 1 to 7, in an exemplary embodiment of the present invention, a finger protective cap 2 is also disclosed. The finger protective cap 2 is suitable for fitting on the installation part 11 at the end of the connection terminal 1, to prevent human fingers from touching the end of the connection terminal 1.

As shown in FIGS. 1 to 7, in an exemplary embodiment of the present invention, a finger protective cap 2 is also disclosed, which is used to fit on the installation part 11 at the end of the connection terminal 1. Finger protective cap 2 mainly includes: a peripheral wall 21, an end wall 20, and an insertion post 22. The end wall 20 is connected to one end of the peripheral wall 21. The end wall 20 and the peripheral wall 21 define an inner cavity 23 suitable for accommodating the installation part 11. The insertion post 22 is located in the inner cavity 23 and connected to the end wall 20 for insertion into the insertion hole 112 on the installation part 11. Therefore, the bonding force between the finger protective cap 2 and the connection terminal 1 has been improved, which can effectively prevent the finger protective cap 2 from falling off the connection terminal 1 and improve the safety of the product.

As shown in FIGS. 1 to 7, in the illustrated embodiment, the inner cavity 23 of the finger protective cap 2 has an opening 24 opposite the end wall 20 to allow the installation part 11 to be inserted into the finger protective cap 2 through the opening 24.

As shown in FIGS. 1 to 7, in the illustrated embodiments, a radial recess 210 is formed on the inner peripheral surface of the peripheral wall 21 of the finger protective cap 2, which is suitable for engagement with the radial protrusion 110 on the outer peripheral surface of the installation part 11.

As shown in FIGS. 1 to 7, in the illustrated embodiments, a corresponding blocking surface 210a is formed on one side of the radial recess 210, which is suitable for pressing against the blocking surface 110a of the radial protrusion 110 to prevent the finger protective cap 2 from being removed from the installation part 11.

As shown in FIGS. 1 to 7, in the illustrated embodiment, the inner diameter of the finger protective cap 2 at the radial recess 210 is slightly smaller than the outer diameter of the radial protrusion 110 on the installation part 11. When the finger protective cap 2 is sleeved on the installation part 11, the inner peripheral surface of the finger protective cap 2 is interference fit with the radial protrusion 110 to increase the engagement force between the finger protective cap 2 and the installation part 11.

As shown in FIGS. 1 to 7, in the illustrated embodiments, the end face 21a of the peripheral wall 21 of the finger protective cap 2 is suitable to rest against the end face 10a of the body part 10 connected to the terminal 1, used to cover the end face 10a of the body part 10 to prevent human fingers from touching the end face 10a of the body part 10. In the illustrated embodiment, when the finger protective cap 2 is installed on the installation part 11, the end face 11a of the installation part 11 usually does not come into contact with the finger protective cap 2, thereby not limiting the installation position of the finger protective cap 2.

Figure 1:
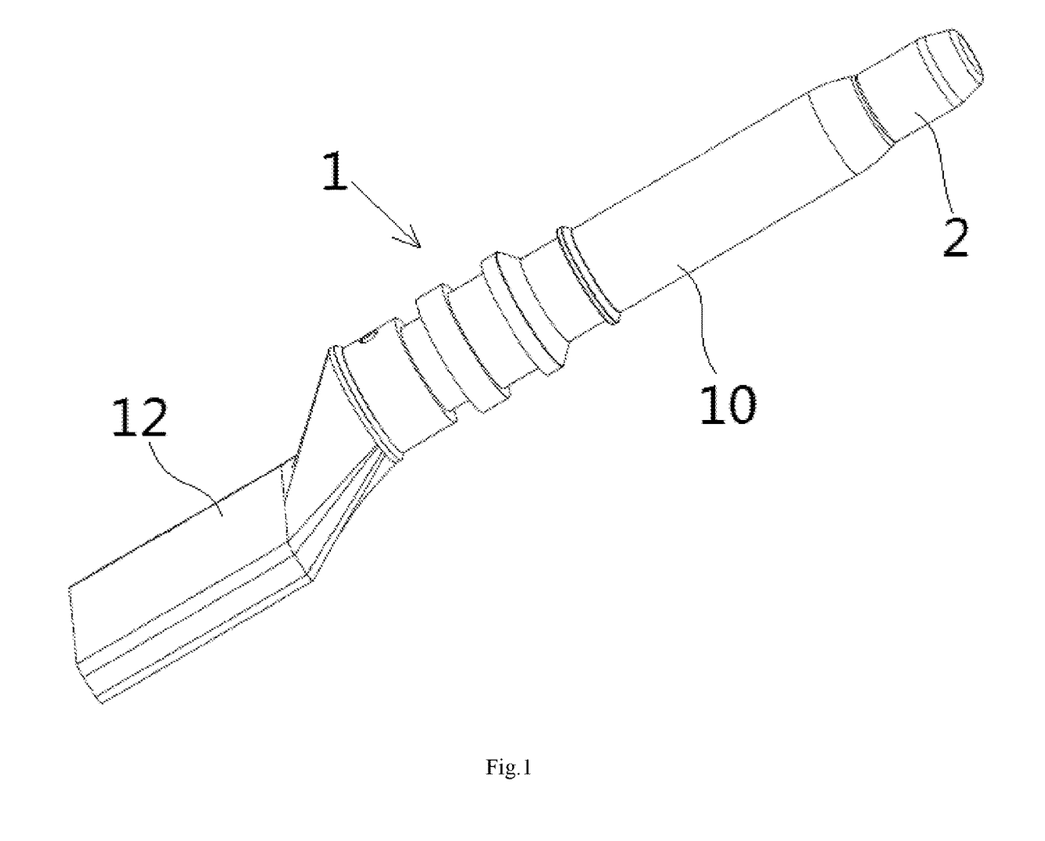
FIG. 1 shows an illustrative assembly view of a connection terminal and a finger protective cap according to an exemplary embodiment of the present invention.
Figure 2:
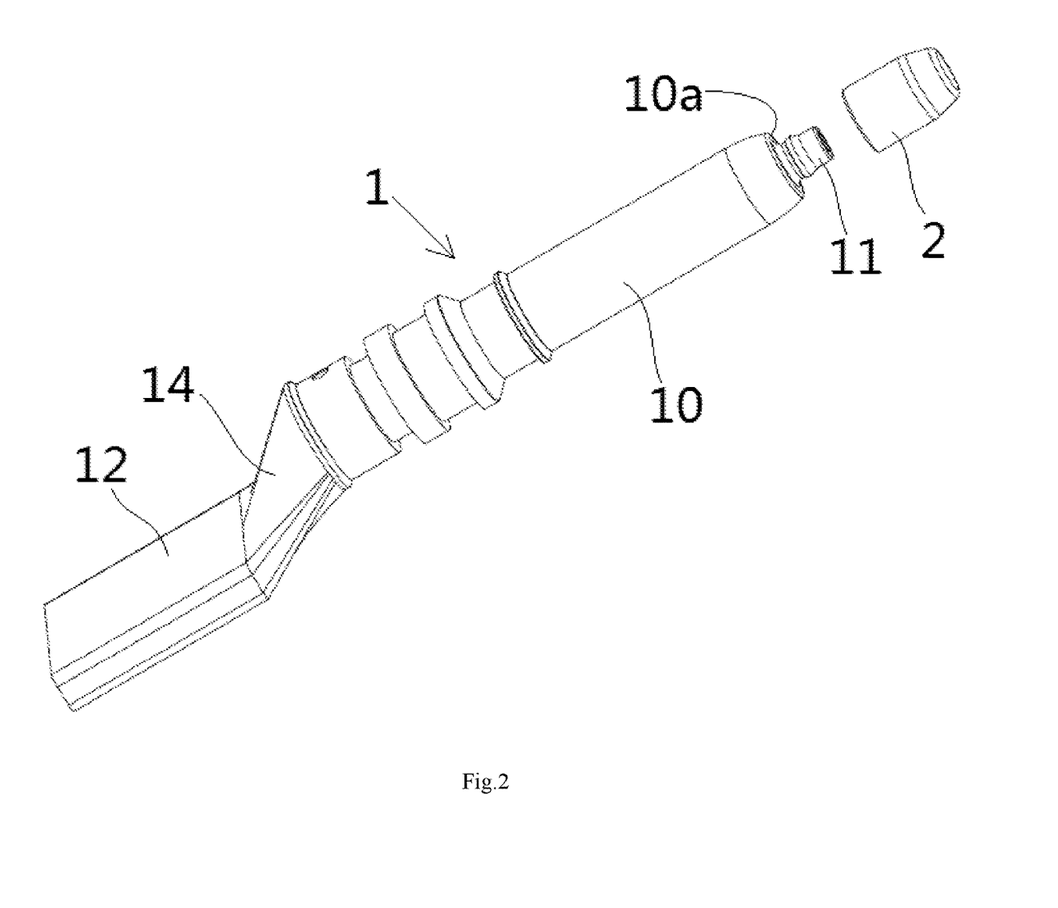
FIG. 2 shows an illustrative exploded view of a connection terminal and a finger protective cap according to an exemplary embodiment of the present invention.
Figure 3:
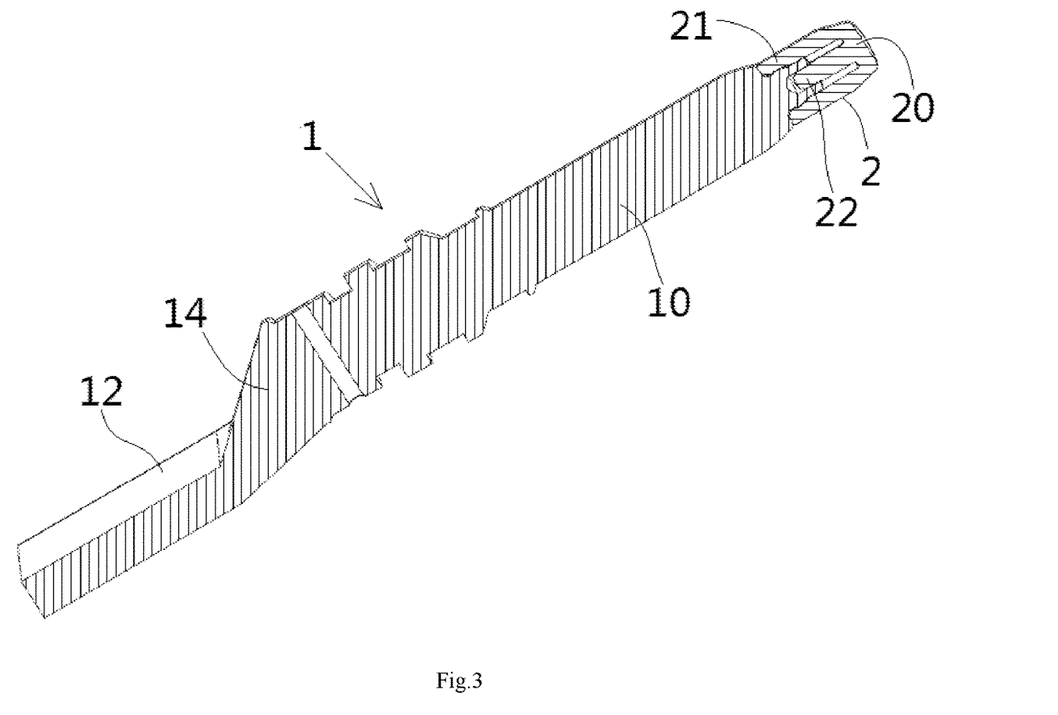
FIG. 3 shows an assembly cross-sectional view of a connection terminal and a finger protective cap according to an exemplary embodiment of the present invention.
Figure 4:
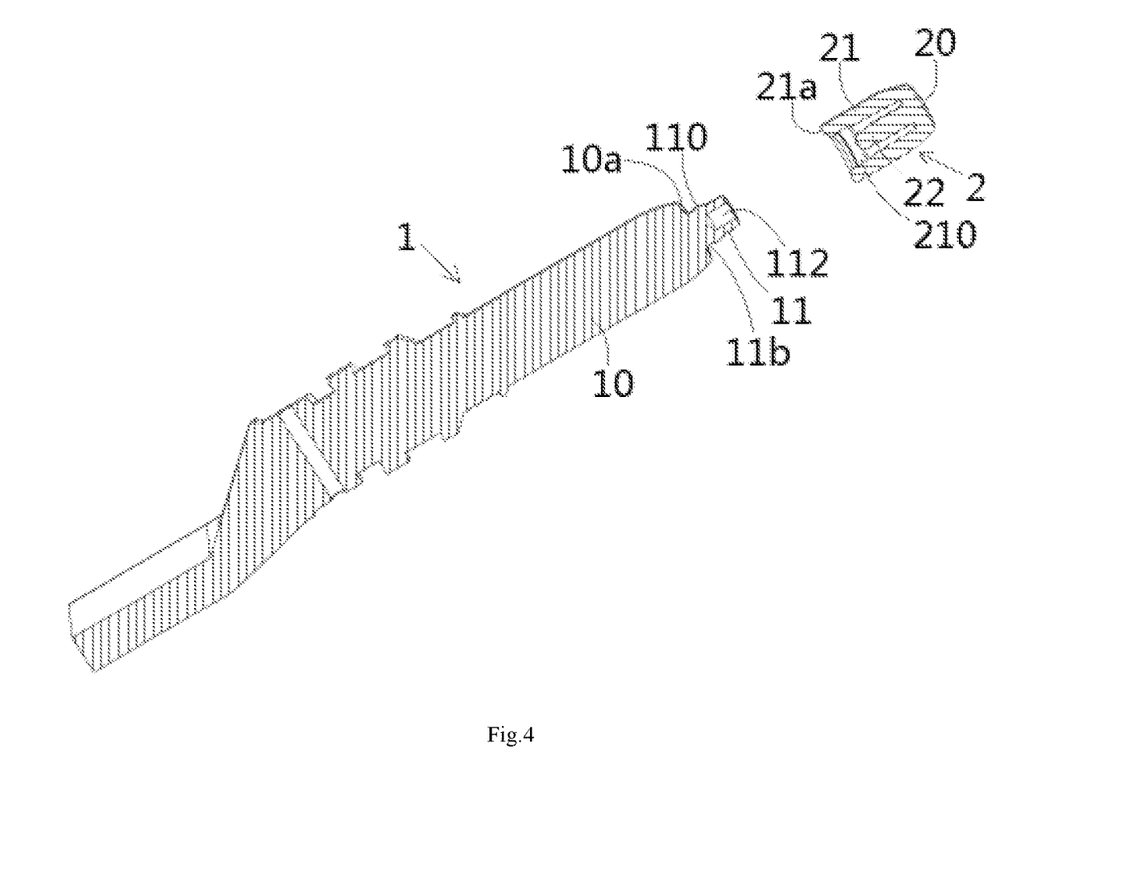
FIG. 4 shows an exploded cross-sectional view of a connection terminal and a finger protective cap according to an exemplary embodiment of the present invention.
Figure 5:
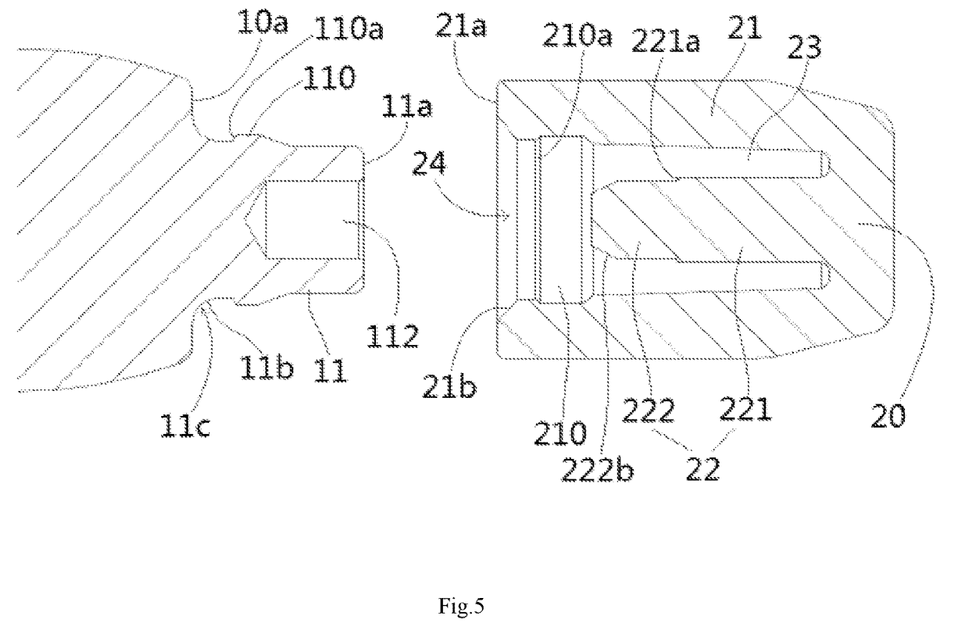
FIG. 5 shows a partially enlarged cross-sectional view of a connection terminal and a finger protective cap according to an exemplary embodiment of the present invention, wherein the finger protective cap has not yet been assembled onto the connection terminal.
Figure 7:
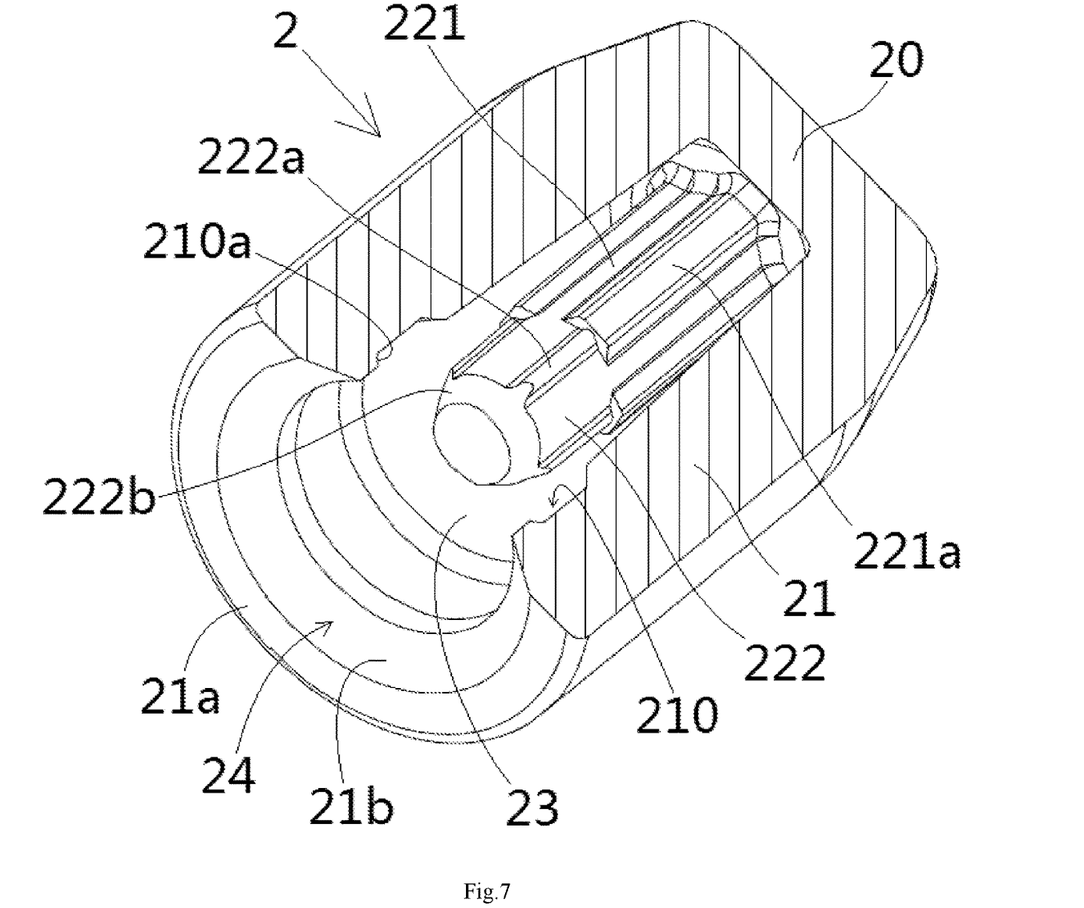
FIG. 7 shows an illustrative perspective view of a finger protective cap according to an exemplary embodiment of the present invention, wherein a portion of the finger protective cap is removed to display its internal structure.

As shown in FIGS. 5 and 7, in the illustrated embodiments, a guiding inclined plane 21b is formed on the inner surface of the peripheral wall 21 at the opening 24, causing the opening 24 to appear in an outward expanding trumpet shape to guide the installation part 11 into the finger protective cap 2.

As shown in FIGS. 5 and 7, in the illustrated embodiments, an inclined guide surface 222b is formed at the end of the insertion post 22 to guide the insertion of the insertion post 22 into the insertion hole 112 on the installation section 11.

The insertion post 22 extends along the axial direction of the finger protective cap 2 from the end wall 20, and the axial extension length of the insertion post 22 is greater than the axial extension length of the insertion hole 112 on the installation part 11.

Figure 6:
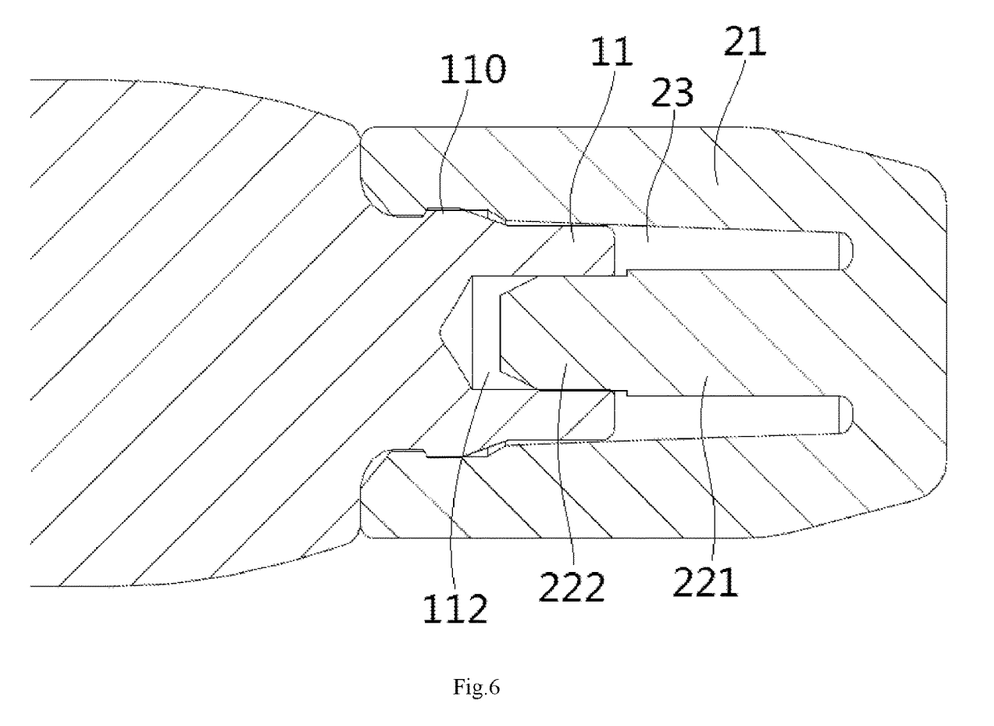
FIG. 6 shows a partially enlarged cross-sectional view of a connection terminal and a finger protective cap according to an exemplary embodiment of the present invention, wherein the finger protective cap has been assembled onto the connection terminal.

As shown in FIGS. 5 to 7, in the illustrated embodiment, the insertion post 22 includes a base part 221 and an insertion part 222. One end of the base part 221 is connected to the end wall 20. The insertion part 222 is connected to the other end of the base part 221. When the finger protective cap 2 is installed on the installation part 11, the insertion part 222 is inserted into the insertion hole 112, and the base part 221 is located outside the insertion hole 112.

As shown in FIGS. 1 to 7, in the illustrated embodiments, the outer diameter of the base part 221 is greater than the outer diameter of the insertion part 222, and the outer diameter of the insertion part 222 is slightly greater than the inner diameter of the insertion hole 112. When the finger protective cap 2 is sleeved on the installation part 11, the insertion part 222 is interference fit with the inner peripheral surface of the insertion hole 112.

As shown in FIGS. 5 and 7, in the illustrated embodiments, multiple first reinforcing ribs 221a extending axially are formed on the peripheral surface of the base part 221, and the multiple first reinforcing ribs 221a are distributed at intervals in the circumferential direction. Multiple second reinforcing ribs 222a extending axially are formed on the peripheral surface of the insertion part 222, and the multiple second reinforcing ribs 222a are distributed at intervals in the circumferential direction and connected axially with the multiple first reinforcing ribs 221a. When the finger protective cap 2 is sleeved on the installation part 11, the second reinforcing rib 222a on the inserting part 222 is interference fit with the inner peripheral surface of the insertion hole 112. That is to say, when the finger protective cap 2 is sleeved on the installation part 11 at the end of the connection terminal 1, the second reinforcing rib 222a on the insertion post 22 is inserted into the insertion hole 112, and is partially deformed due to the compression of the hole wall of the insertion hole 112, so that the insertion post 22 and the hole wall of the insertion hole 112 form an interference fit.

As shown in FIG. 7, in the illustrated embodiments, the outer circumference of the base part 221 is flush with the outer circumference of the insertion part 222, and the radial and circumferential dimensions of the first reinforcing rib 221a are larger than those of the second reinforcing rib 222a, respectively.

In the illustrated embodiment, the finger protective cap 2 is an integral component. For example, the finger protective cap 2 can be an integral injection molded part made of insulating material.

In the illustrated embodiments, the extension length of the finger protective cap 2 in its axial direction is not less than twice, three times, or four times the axial extension length of the installation part 11.

As shown in FIGS. 1 to 7, in an exemplary embodiment of the present invention, a connection terminal assembly is also disclosed. The connection terminal assembly includes: the connection terminal 1 and the finger protective cap 2. The connection terminal 1 has an installation part 11 located at its end. The finger protective cap 2 is installed on the installation part 11 at the end of the connection terminal 1. An insertion hole 112 is formed on the installation part 11, and the insertion post 22 on the finger protective cap 2 is inserted into the insertion hole 112 of the installation part 11.

As shown in FIGS. 1 to 7, in an exemplary embodiment of the present invention, a cable assembly is also disclosed. The cable assembly includes: a cable, a connection terminal 1, and a finger protective cap 2. The cable has an exposed cable conductor. The cable conductor is soldered to the connection terminal 1. The finger protective cap 2 is installed on the installation part 11 at the end of the connection terminal 1.

As shown in FIGS. 1 to 7, in an exemplary embodiment of the present invention, a charging seat is also disclosed. The charging seat includes a housing, a connection terminal 1, and a finger protective cap 2. The connection terminal 1 is inserted into the housing. The finger protective cap 2 is installed on the installation part 11 at the end of the connection terminal 1. In the illustrated embodiment, the charging seat also includes a cable with an exposed cable conductor welded to the connection terminal 1.

As shown in FIGS. 1 to 7, in an exemplary embodiment of the present invention, a connection terminal 1 is also disclosed. An installation part 11 is formed at the end of the connection terminal 1, which is adapted to be inserted into the aforementioned finger protective cap 2. An insertion hole 112 is formed on the installation part 11 that is suitable for fitting with the insertion post 22 inside the finger protective cap 2.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connection terminal, comprising:
    a body part insertable into a mating terminal for electrical contact with the mating terminal; and
    an installation part insertable into a finger protective cap for installing the finger protective cap, the installation part is formed on and protrudes from an end face of an end of the body part, a root of the installation part connected to the end face of the body part is formed into an arc-shaped connection part preventing stress concentration at the root, wherein the installation part has an insertion hole, the insertion hole is matable with an insertion post inside the finger protective cap,
    wherein a radial protrusion is formed on an outer peripheral surface of the installation part, the radial protrusion engages a radial recess formed on an inner peripheral surface of the finger protective cap.

2. The connection terminal according to claim 1, wherein an arc-shaped chamfer is formed at the root.

3. The connection terminal according to claim 2, wherein the installation part extends along an axial direction of the body part, the end face of the body part extends along a radial direction of the body part, and a cross section of the arc-shaped chamfer is an arc with a central angle equal to 90 degrees.

4. The connection terminal according to claim 1, wherein a blocking surface is formed on a side of the radial protrusion of the installation part, the blocking surface rests against a corresponding blocking surface of the radial recess inside the finger protective cap and prevents removal of the finger protective cap from the installation part.

5. The connection terminal according to claim 4, wherein an outer diameter of the radial protrusion on the installation part is larger than an inner diameter of the finger protective cap at the radial recess.

6. The connection terminal according to claim 5, wherein, when the finger protective cap is sleeved on the installation part, the radial protrusion on the installation part is interference fit with the inner peripheral surface of the finger protective cap to increase an engagement force between the finger protective cap and the installation part.

7. The connection terminal according to claim 1, wherein, when the finger protective cap is installed on the installation part, the end face of the body part is pressed against an end face of an open end of the finger protective cap and is covered by the finger protective cap.

8. The connection terminal according to claim 1, wherein an extension length of the installation part in an axial direction of the body part is not greater than half, one-third, or quarter of an axial extension length of the finger protective cap.

9. A connection terminal, comprising:
    a body part insertable into a mating terminal for electrical contact with the mating terminal; and
    an installation part insertable into a finger protective cap for installing the finger protective cap, the installation part is formed on and protrudes from an end face of an end of the body part, a root of the installation part connected to the end face of the body part is formed into an arc-shaped connection part preventing stress concentration at the root,
    the connection terminal further comprising a welding end connected to another end of the body part and weldable to a cable conductor, wherein the welding end is flat, the body part is cylindrical, and the welding end is radially offset to a side relative to the body part, a central axis of the cable conductor welded to a top surface of the welding end coincides with a central axis of the body part or a distance between the central axis of the cable conductor and the central axis of the body part is less than a predetermined value.

10. A connection terminal assembly, comprising:
    a connection terminal including a body part insertable into a mating terminal for electrical contact with the mating terminal and an installation part, the installation part is formed on and protrudes from an end face of an end of the body part, a root of the installation part connected to the end face of the body part is formed into an arc-shaped connection part preventing stress concentration at the root; and
    a finger protective cap sleeved on the installation part, wherein a radial protrusion is formed on an outer peripheral surface of the installation part, the radial protrusion engages a radial recess formed on an inner peripheral surface of the finger protective cap and does not extend beyond an outer peripheral surface of the finger protective cap.

11. The connection terminal assembly of claim 10, wherein the installation part has an insertion hole, an insertion post is formed inside the finger protective cap, and the insertion post is inserted into the insertion hole of the installation part.

12. The connection terminal assembly of claim 11, wherein a reinforcing rib is formed on an outer peripheral surface of the insertion post, and when the finger protective cap is sleeved on the installation part at the end of the connection terminal, the reinforcing rib is inserted into the insertion hole and is partially deformed due to compression of a hole wall of the insertion hole, the insertion post and the hole wall of the insertion hole form an interference fit.

13. The connection terminal assembly of claim 11, wherein an inner diameter of the insertion hole on the installation part is smaller than an outer diameter of the insertion post inside the finger protective cap.

14. The connection terminal assembly of claim 13, wherein, when the finger protective cap is sleeved on the installation part, an inner peripheral surface of the insertion hole is interference fit with the insertion post in the finger protective cap.

15. A cable assembly, comprising:
a cable having an exposed cable conductor;
a connection terminal including a body part insertable into a mating terminal for electrical contact with the mating terminal, an installation part, and a welding end, the installation part is formed on and protrudes from an end face of an end of the body part, a root of the installation part connected to the end face of the body part is formed into an arc-shaped connection part preventing stress concentration at the root, the exposed cable conductor is welded to the welding end; and
a finger protective cap sleeved on the installation part, wherein a radial protrusion is formed on an outer peripheral surface of the installation part, the radial protrusion engages a radial recess formed on an inner peripheral surface of the finger protective cap and does not extend beyond an outer peripheral surface of the finger protective cap.

16. A charging seat, comprising:
a housing;
a connection terminal disposed in the housing, the connection terminal including a body part insertable into a mating terminal for electrical contact with the mating terminal and an installation part, the installation part is formed on and protrudes from an end face of an end of the body part, a root of the installation part connected to the end face of the body part is formed into an arc-shaped connection part preventing stress concentration at the root; and
a finger protective cap sleeved on the installation part, wherein a radial protrusion is formed on an outer peripheral surface of the installation part, the radial protrusion engages a radial recess formed on an inner peripheral surface of the finger protective cap and does not extend beyond an outer peripheral surface of the finger protective cap.

17. The charging seat of claim 16, further comprising a cable having an exposed cable conductor welded to a welding end of the connection terminal.

* * * * *